United States Patent [19]

Hoppe

[11] Patent Number: 5,715,023
[45] Date of Patent: Feb. 3, 1998

[54] PLANE PARALLEL OPTICAL COLLIMATING DEVICE EMPLOYING A CHOLESTERIC LIQUID CRYSTAL

[75] Inventor: Michael J. Hoppe, Carlsbad, Calif.

[73] Assignee: Kaiser Electro-Optics, Inc., Carlsbad, Calif.

[21] Appl. No.: 641,389

[22] Filed: Apr. 30, 1996

[51] Int. Cl.⁶ .................. G02F 1/1335; G02F 1/13; G02B 27/14
[52] U.S. Cl. .................. 349/11; 349/176; 359/630; 359/631
[58] Field of Search .................. 349/158, 160, 349/11, 13, 176, 194; 359/583, 630, 632, 631, 581

[56] References Cited

U.S. PATENT DOCUMENTS

| | | |
|---|---|---|
| 3,679,290 | 7/1972 | Adams et al. . |
| 3,711,181 | 1/1973 | Adams, Jr. et al. . |
| 3,816,005 | 6/1974 | Kirschner .................. 359/631 |
| 3,957,348 | 5/1976 | Saeva . |
| 4,390,276 | 6/1983 | Budden et al. .................. 33/233 |
| 4,704,010 | 11/1987 | Stana et al. . |
| 4,781,426 | 11/1988 | Baker . |
| 5,028,121 | 7/1991 | Baur et al. .................. 349/194 |
| 5,050,966 | 9/1991 | Berman . |
| 5,267,063 | 11/1993 | Ray . |
| 5,371,617 | 12/1994 | Mitsutake et al. . |
| 5,379,135 | 1/1995 | Nakagaki et al. . |
| 5,408,346 | 4/1995 | Trissel et al. . |

FOREIGN PATENT DOCUMENTS

04511034 A1  10/1991  European Pat. Off. .

*Primary Examiner*—William L. Sikes
*Assistant Examiner*—Walter Malinowski
*Attorney, Agent, or Firm*—David G. Beck; Townsend and Townsend and Crew

[57] ABSTRACT

A compact lightweight display system which can be used as a collimating eyepiece is provided. The system utilizes a cholesteric liquid crystal device in combination with an optical doublet. A partially reflective coating is at the interface between the two singlets which comprise the doublet. The design of this system reduces the number of element to air and/or element to element interfaces, thus reducing losses and ghosting while making a sturdier, more vibration tolerant display system.

21 Claims, 3 Drawing Sheets

PLANE PARALLEL OPTICAL COLLIMATING DEVICE EMPLOYING A CHOLESTERIC LIQUID CRYSTAL

The present invention relates generally to visual display systems and, more particularly, to a compact, collimating eyepiece utilizing a cholesteric liquid crystal element and two plano singlets cemented together with a partially reflective coating interposed between the two singlets.

BACKGROUND OF THE INVENTION

Optical collimating apparatus have been known for some time. For example, U.S. Pat. No. 4,704,010 discloses a device capable of generating an optical collimating beam using a single, plano-convex lens. A collimating mark is applied on the convex surface and a reflective coating is applied to the central portion of the plano surface. Light emanating from the collimating mark makes a double pass through the lens, exiting the plano surface as a collimated beam. The collimating mark is imaged at infinity. In a specific embodiment, the collimating mark is illuminated using a prism.

U.S. Pat. No. 3,679,290 discloses an optical filtering system which uses combinations of cholesteric liquid crystal films. In one disclosed embodiment, two cholesteric liquid crystal films, each having an opposite rotary sense of circular polarization and centered at the same wavelength, are combined into a single filter. The filter passes all radiation which is outside the wavelength band centered at the films' wavelength while reflecting light within the band. Light within the band is reflected by one of the two liquid crystal films depending upon its polarization. The patent teaches using combinations of the cholesteric liquid crystal films to produce a variety of filters.

U.S. Pat. No. 3,711,181 discloses an optical filtering system quite similar to that disclosed in U.S. Pat. No. 3,679,290. This patent teaches placing a cholesteric liquid crystal film on either side of a polarizing element. The two cholesteric films have the same rotary sense of polarization and are centered at the same wavelength. The polarizing element converts circularly polarized light of one sense to circularly polarized light of the opposite sense. Thus light entering the composite structure within the selected wavelength band will be rejected either by the first film or, after being converted by the polarizing element, by the second film.

U.S. Pat. No. 5,050,966 discloses an optical display system in which a combiner is used to combine a first image incident on the combiner in a first direction with a second image incident on the combiner from a second direction. The combiner includes at least one cholesteric liquid crystal element which transmits the first image into the line of sight and reflects the second image into the line of sight. A multicolor display system is fabricated by using multiple cholesteric elements tuned to different wavelengths.

U.S. Pat. No. 5,408,346 discloses an optical collimating device using a cholesteric liquid crystal element, the device exhibiting improved image transmissivity. Both reflective and transmissive systems are disclosed. The patent also teaches the use of the collimator in conjunction with a combiner, thus allowing multiple images to be superimposed for viewing by the user.

From the foregoing, it is apparent that a compact, collimating eyepiece is desired. This device is of particular interest in the area of head-mounted displays where size and weight are critical factors.

SUMMARY OF THE INVENTION

The present invention provides a compact, lightweight display system which finds particular application as a collimating eyepiece. The system utilizes a cholesteric liquid crystal (CLC) device in combination with a doublet. A partially reflective coating is at the interface between the two singlets which comprise the doublet. The design of this system reduces the number of element to air and/or element to element interfaces, thus reducing losses and ghosting while making a sturdier, more vibration tolerant display system.

According to the preferred embodiment of the invention, the collimation apparatus includes an image source to generate image light having components within a predetermined wavelength band. The light emitted by the source passes through a linear polarizer and a quarter wave retarder in order to impart a particular rotary sense of circular polarization to the light. The light then passes through a plano-concave singlet, a partially reflective coating, and a plano-convex singlet prior to impinging upon a CLC device. The CLC device is oriented to receive and reflect the light within the predetermined wavelength band which is of the particular rotary sense of polarization. The CLC device reflects the incident light back towards the partially reflective coating at the singlet-singlet interface. That portion of the light reflected by the coating changes its rotary sense of polarization. The shape and curvature of the coating conforms to the singlet-singlet interface and the light reflected by the coating is collimated according to power of the reflective interface. Since that portion of the light which is reflected by the coating changes its rotary sense of polarization, it now passes unheeded through the CLC device on the second pass.

In a particular embodiment of the invention, the image source is directly bonded to the singlet/singlet/CLC device composite structure. In another embodiment, the image source is reflected off of a combiner into the singlet/singlet/CLC device composite structure, thus allowing a second image to be combined with the first image. In another embodiment, multiple CLC devices centered at different wavelength bands are used in a single structure, thus providing a multicolor collimating eyepiece.

A further understanding of the nature and advantages of the present invention may be realized by reference to the remaining portions of the specification and the drawings.

DESCRIPTION OF THE PREFERRED EMBODIMENT

The present invention utilizes certain properties of cholesteric liquid crystal (CLC) devices that are well known to those of skill in the art to which this invention pertains. For a more detailed discussion of those properties, reference is made to the discussions contained in U.S. Pat. Nos. 4,859, 031 and 4,900,133. For completeness and to insure understanding of the present invention in this single document, certain of those properties will be outlined here before discussing the details of the invention.

Cholesteric liquid crystal (CLC) devices can be constructed to reflect all wavelengths of electromagnetic radiation, specifically visible light, except for those components of light that are (i) within a particular wavelength band centered around a primary wavelength and (ii) of a particular rotary sense of circular polarization. For example, a CLC device may be constructed to reflect right hand circularly polarized (RHCP) light in a narrow band centered at 540 nanometers. Thus all left hand circularly polarized (LHCP) light, including light with a wavelength of 540 nanometers, would be transmitted by the device. RHCP light that is not within the wavelength band would also be transmitted while RHCP light within the band would be reflected. Neither the polarization of the transmitted light nor the polarization of the reflected light is changed due to the CLC device. Conversely, of course, the CLC may be designed to reflect LHCP light in a specific band centered at a primary wavelength while transmitting RHCP light of the same wavelength.

Figure 1:
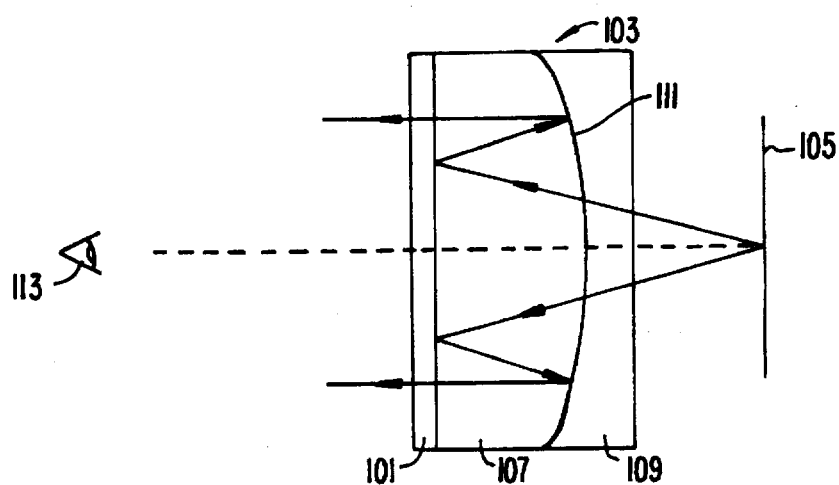
FIG. 1 is an illustration of an embodiment of the invention utilizing a CLC device and a doublet.

Turning now to the figures, FIG. 1 is an illustration of an embodiment of the invention utilizing a CLC device 101 and a doublet 103. The system also includes an image source 105.

Doublet 103 is comprised of two plano singlets, 107 and 109, cemented together. Singlet 107 is a plano-convex lens and singlet 109 is a plano-concave lens. Singlets 107 and 109 have the same radius of curvature. At the boundary between singlets 107 and 109 is a partially reflective coating 111. In the preferred embodiment coating 111 is a dielectric coating with a transmittance of approximately 50 percent and a reflectance of approximately 50 percent in the wavelength range of interest.

In operation, light from source 105 which is of the same polarization and within the wavelength band for which CLC device 101 is tuned will pass, in part, through doublet 103 and reflect off of CLC device 101, neither operation altering the light's polarization. The light reflected by CLC 101 will then be redirected towards coating 111. That portion of the redirected light which is reflected by coating 111 will then change polarization, thus allowing it to pass virtually unheeded through CLC 101 as a collimated light beam.

For example, if CLC 101 is tuned to 540 nanometers and reflects RHCP light and source 105 is a monochrome source operating at 540 nanometers and radiating RHCP light, approximately 25 percent of the source radiation will be collimated by doublet 103 and pass through the device to be viewed at a site 113. This figure assumes a 50/50 coating, thus causing approximately 50 percent of the radiation to be lost on each pass through, or reflected off of, coating 111. This collimating display system works equally as well at other wavelengths and with a different rotary sense of polarization. The choice of both polarization and wavelength in this example is purely arbitrary.

The embodiment illustrated in FIG. 1 does not contain any polarizers or filters. Therefore radiation produced by source 105 which either has a rotary sense different from that of CLC 101 or is at a wavelength outside the band of wavelengths for which CLC 101 is tuned, will pass unheeded through CLC 101. Radiation in these regimes will not be collimated by doublet 103 and therefore will reduce the quality of the image displayed at site 113.

Figure 2:
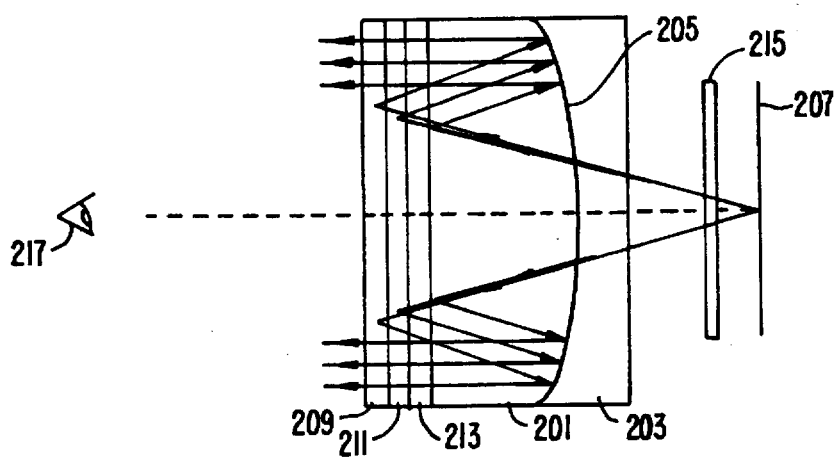
FIG. 2 is an illustration of a multicolor embodiment of the invention utilizing three CLC devices.

FIG. 2 illustrates a multicolor embodiment of the invention utilizing three CLC devices. This embodiment, as that shown in FIG. 1, is comprised of a plano-convex singlet 201, a plano-concave singlet 203, a partially reflective coating 205 interposed between singlets 201 and 203, and a source 207. CLC devices 209, 211, and 213 each have the same rotary sense of polarization. However, each CLC is tuned to a different wavelength band thus allowing three separate colors to pass through the display device. Since the CLC devices will pass radiation outside of the wavelength bands to which they are tuned, it is preferable for source 207 to emit radiation only within the three CLC wavelength bands. Matching the source wavelengths with the CLC device wavelengths improves upon the system's signal-to-noise ratio as well as reducing ghosting. If the source emits radiation outside of the CLC wavelength bands an optional filter 215 can be installed which passes only the wavelength bands of interest.

In a specific example, source 207 emits LHCP light at and about the wavelengths of 400, 510, and 620 nanometers and partial reflective coating 205 is a 50/50 coating at all three wavelengths. CLC devices 209, 211, and 213 reflect LHCP light at 400, 510, and 620 nanometers, respectively. In operation, approximately 50 percent of the 620 nanometer wavelength radiation would pass through the doublet and be reflected by CLC device 213 back towards coating 205. Approximately 50 percent of this reflected light would be reflected off of coating 205 at which time its polarization would De changed from LHCP to RHCP. This collimated radiation would then pass through all three CLC devices to be viewed by an observer 217. Similarly, 510 and 400 nanometer wavelength radiation would be reflected by CLC devices 211 and 209, respectively, eventually being directed into the line of sight of observer 217.

Figure 3:
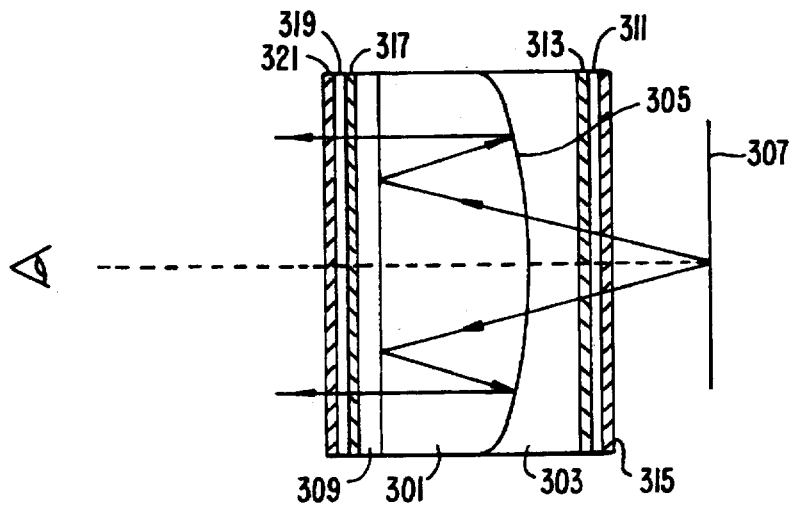
FIG. 3 is an illustration of the invention utilizing polarizers directly applied to the surfaces of the device.

FIG. 3 illustrates an alternate embodiment of the invention. This embodiment, as in the previous embodiments, is comprised of a plano-convex singlet 301, a plano-concave singlet 303, a partially reflective coating 305 interposed between singlets 301 and 303, and a source 307. Although this particular embodiment is a single color system and therefore requires only a single CLC device 309, the system could be made into a multicolor system as previously shown.

In this embodiment source 307 produces randomly polarized light in at least the wavelength band for which CLC device 309 is tuned. If desired, a filter such as filter 215 in FIG. 2 can be used to limit the wavelength of source 307 to the wavelength band of interest. Although any number of source types can be used in this embodiment, preferably source 307 is a cathode ray tube (CRT) or a liquid crystal display (LCD). The light from source 307 is linearly polarized with polarizer 311 and then passed through a quarter wavelength retarder 313 which circularly polarizes the image light to the same rotary sense as that of CLC device 309. To reduce reflectance losses, an anti-reflection (AR) coating 315 is applied to the outer surface of polarizer 311. The light which passes through the display system then passes through an optional coating stack in order to improve image contrast and reduce ghosting. This stack is comprised of a quarter wave retarder 317, a linear polarizer 319, and an AR coating 321.

Figure 4:
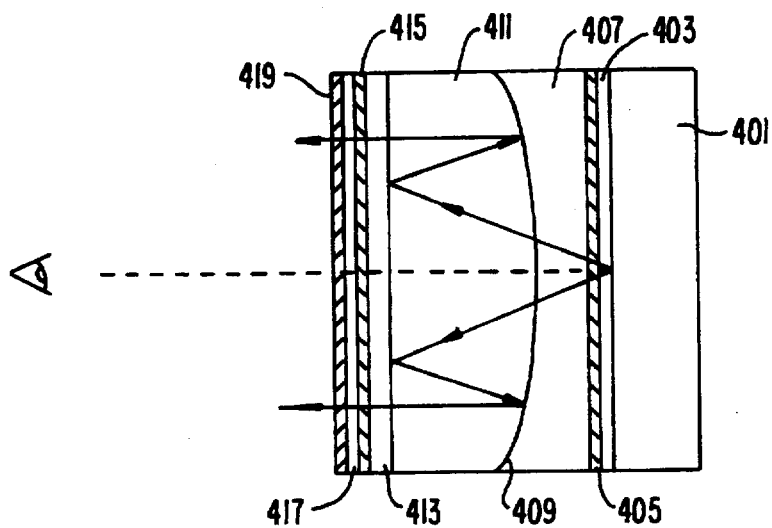
FIG. 4 is an illustration of a single color display system according to the present invention in which an LCD display source is directly attached to the eyepiece optical train.

FIG. 4 illustrates an alternate embodiment of the system shown in FIG. 3. In this system a source 401 is directly adhered to the device. Thus the total system is comprised of source 401, linear polarizer 403, quarter wave retarder 405, plano-concave singlet 407, partial reflective coating 409, plano-convex singlet 411, CLC device 413, quarter wave retarder 415, linear polarizer 417, and AR coating 419. The only surface to air interface in this system is that at the exit plane, thus eliminating numerous sources of radiation loss and ghosting as well as improving image contrast and reducing the complexity and cost of the system.

Figure 5:
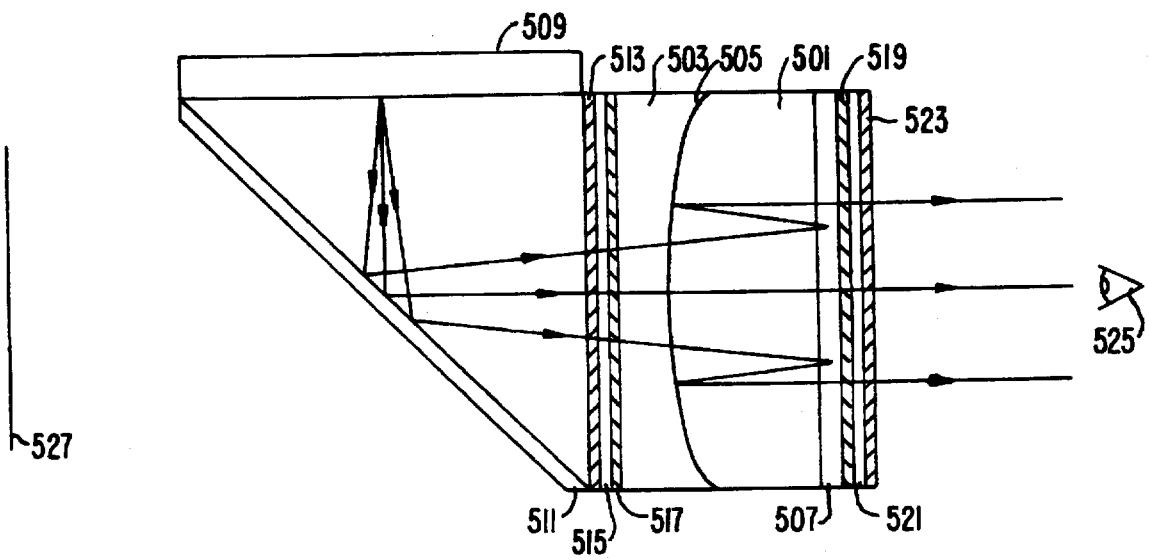
FIG. 5 is an illustration of an embodiment of the present invention which allows an image from a first source to be combined with an image from a second source.

FIG. 5 is an illustration of an embodiment of the present invention which allows an image from a first source to be combined with an image from a second source. The basic system in this embodiment is comprised of plano-convex singlet 501, plano-concave singlet 503, partial reflective coating 505 interposed between singlets 501 and 503, CLC device 507, source 509, and combiner 511. The system also contains AR coating 513, linear polarizer 515, and quarter wave retarder 517. Retarder 517 circularly polarizes the source light so that it has the same rotary sense as CLC device 507. Source 509 emits radiation in the wavelength band to which CLC device 507 is tuned. For improved performance the system also contains quarter wave retarder 519, linear polarizer 521, and AR coating 523. By adding multiple CLC devices, as described above, this system can provide multicolor images from display source 509 to observer 525.

Many techniques are well known in the art for the fabrication of combiner 511. For example, combiner 511 can be a partial reflector which reflects the image from source 509 into the line of sight of an observer 525 while simultaneously passing the image of source 527 to the observer. Another type of combiner which can be used in this embodiment is a combiner which has a selective reflective coating. For example, if display source 509 and CLC device 507 operate at 540 nanometers, a coating can be applied to combiner 511 which reflects 540 nanometer light while passing all other wavelengths. The advantage of this technique is that the reflective coating can be made very efficient, thus reflecting most of the radiation from source 509 while passing all but a very small portion of the spectrum radiated by source 527.

If source 509 is an LCD, then the light emitted by source 509 is linearly polarized. Given this light source, in the preferred embodiment of this configuration combiner 511 is a polarizing beam splitter which is highly efficient in reflecting the polarized light emitted by source 509. Thus if source 509 emits s-polarized light, preferably combiner 511 reflects approximately 90 percent of the s-polarized light. Given a 90/10 beam splitter, and further assuming that source 527 emits unpolarized light, approximately 50 percent of the light emitted by source 527 will be passed by combiner 511. In this configuration linear polarizers 515 and 521 are not required.

Figure 6:
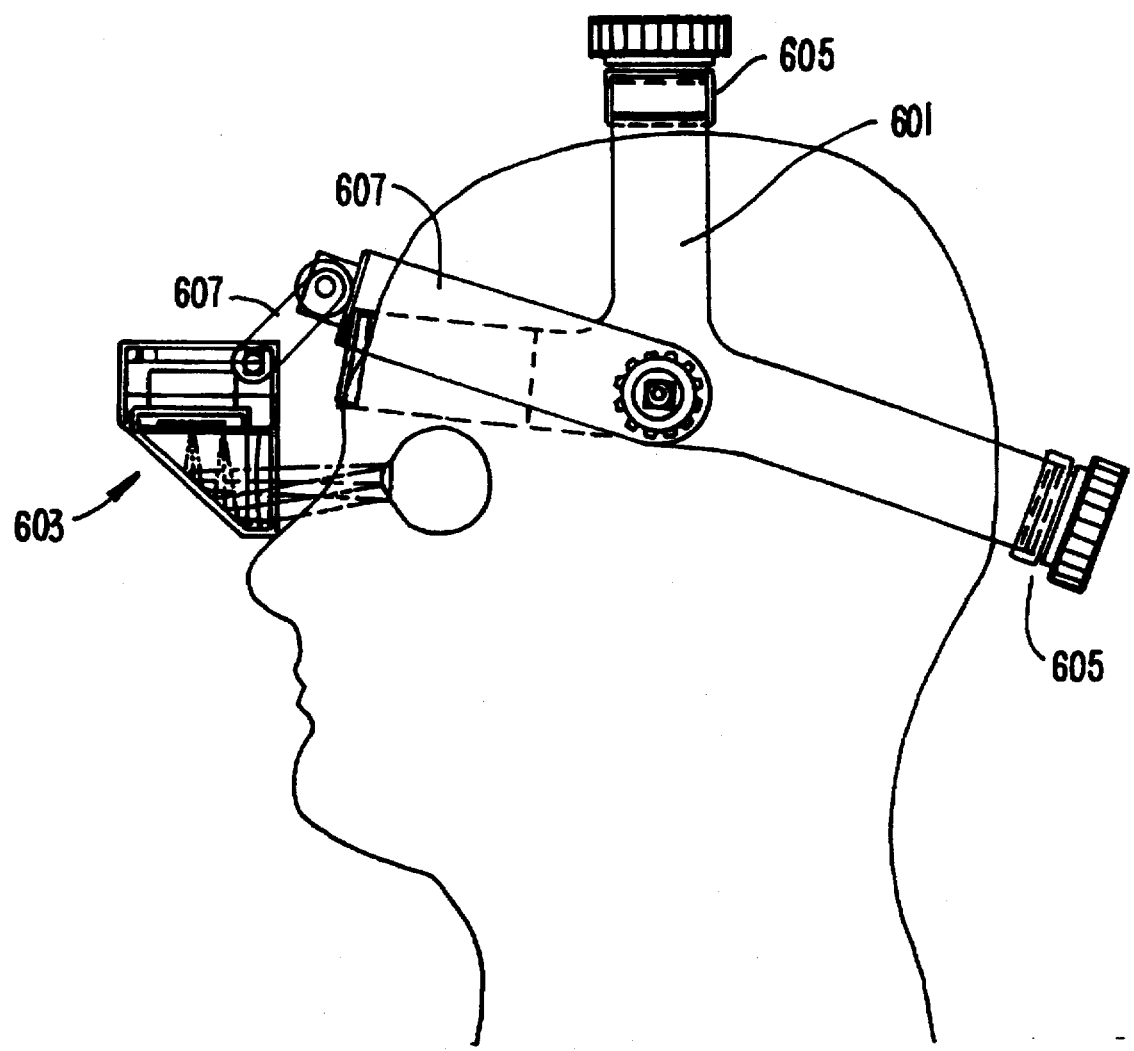
FIG. 6 illustrates the use of the invention in a headset configuration.

FIG. 6 illustrates the use of the invention in a headset configuration. The apparatus in this configuration includes a head mount 601 which attaches the apparatus to a user's head, and a display 603. In this embodiment display 603 is of the same design as shown in FIG. 5. Sizing knobs 605 adjust the size of the head mount to fit an individual user's head size. Display 603 is attached to head mount 601 via adjustable arms 607.

In general, those skilled in the art to which this invention relates will recognize that many changes in construction and widely differing embodiments will suggest themselves without departing from the spirit and essential characteristics thereof. For example, the composition of the CLC device can be selected to provide a wavelength band centered at a wavelength of one's choosing. Likewise, the bandwidth of maximum reflection around the selected wavelength may be varied as a function of the composition of the CLC device. Also, several CLC devices covering different wavelength bands can be stacked together to provide wider bandwidth operation or to provide multicolor operation.

Further, the physical arrangement of components of the invention may be varied with specific results. For example, the curvature of singlets 107 and 109 may be varied in order to impart different optical powers to the system. Further, depending upon the desired application, the shape of the interface between singlets 107 and 109 may be spherical, aspheric, or plano. Further still, the reflective coating between the singlets need not be a 50/50 dielectric coating.

Accordingly, the disclosures and descriptions herein are intended to be illustrative, but not limiting, of the scope of the invention which is set forth in the following claims.

I claim:

1. An optical collimating apparatus for focussing an image at infinity or at a desired finite distance as viewed by an observer, the apparatus comprising:

a first optical singlet having a first surface and a second surface;

a second optical singlet having a first surface and a second surface, said first surface of said first optical singlet coupled to said first surface of said second optical singlet;

a partially reflective coating interposed between said first surface of said first optical singlet and said first surface of said second optical singlet;

an image source for producing said image with light within at least a first wavelength band and with at least a first rotary sense of circular polarization, said image source proximate to said second surface of said first optical singlet; and a first cholesteric liquid crystal element proximate to said second surface of said second optical singlet, said first cholesteric liquid crystal element reflecting light of said first rotary sense of circular polarization within said first wavelength band.

2. The apparatus of claim 1, wherein said first surface of said first optical singlet is concave, said second surface of said first optical singlet is plano, said first surface of said second optical singlet is convex, and said second surface of said second optical singlet is plano.

3. The apparatus of claim 1, wherein said first and second optical singlets are coupled together using optical cement.

4. The apparatus of claim 1, wherein said image source is comprised of a liquid crystal display transmitting linearly polarized light and a circular polarizer for converting said linearly polarized light to at least said first rotary sense of circular polarization.

5. The apparatus of claim 1, wherein said image source is comprised of a liquid crystal display transmitting linearly polarized light and a quarter wave retarder element for converting said transmitted linearly polarized light to at least said first rotary sense of circular polarization.

6. The apparatus of claim 1, wherein said image source is comprised of a simple source, a linear polarizing element, and a circular polarizer for converting linearly polarized light to at least said first rotary sense of circular polarization.

7. The apparatus of claim 6, further comprising a filter interposed between said image source and said linear polarizing element, said filter passing only light within said first wavelength band.

8. The apparatus of claim 1, wherein said image source is comprised of a simple source, a linear polarizer for linearly polarizing light from said simple source, and a quarter wave retarder element for converting said linearly polarized light to at least said first rotary sense of circular polarization.

9. The apparatus of claim 8, wherein said quarter wave retarder element is bonded to said second surface of said first optical singlet and said linear polarizing element is bonded to said quarter wave retarder element.

10. The apparatus of claim 9, further comprising an anti-reflection coating applied to said linear polarizing element.

11. The apparatus of claim 1, wherein said image source is bonded to said second surface of said first optical singlet.

12. The apparatus of claim 1, wherein a first surface of said first cholesteric liquid crystal element is bonded to said second surface of said second optical singlet.

13. The apparatus of claim 12, further comprising:
    a quarter wave retarder element bonded to a second surface of said first cholesteric liquid crystal element; and
    a linear polarizing-element bonded to said quarter wave retarder element.

14. The apparatus of claim 13, further comprising an anti-reflection coating bonded to said linear polarizing element.

15. The apparatus of claim 1, further comprising a second cholesteric liquid crystal element proximate to said first cholesteric liquid crystal element, said second cholesteric liquid crystal element reflecting light of said first rotary sense of polarization within a second wavelength band, wherein said image source produces said image with light within said second wavelength band.

16. The apparatus of claim 1, further comprising a combiner element to combine said image with a second image produced by a second image source, said second image source in the line-of-sight of the observer, said combiner element interposed between said second image source and said second surface of said first optical singlet.

17. An optical apparatus for combining a first image and a second image, the apparatus comprising:
    a first optical singlet having a first surface and a second surface;
    a second optical singlet having a first surface and a second surface, said first surface of said first optical singlet coupled to said first surface of said second optical singlet;
    a partially reflective coating interposed between said first surface of said first optical singlet and said first surface of said second optical singlet;
    a LCD image source producing said first image with linearly polarized light of a first linear polarization within at least a first wavelength band;
    a polarizing beam splitter interposed between said LCD image source and said second surface of said first optical singlet, wherein a portion of said light of said first linear polarization and within said first wavelength band from said LCD image source is reflected by said polarizing beam splitter toward said first optical singlet;
    a second image source producing said second image, wherein a portion of said light from said second image source is transmitted by said polarizing beam splitter toward said first optical singlet;
    a circular polarizer proximate to said second surface of said first optical singlet, wherein said circular polarizer converts light of said first linear polarization to light of said first rotary sense of circular polarization; and
    a cholesteric liquid crystal element proximate to said second surface of said second optical singlet, said cholesteric liquid crystal element reflecting light of said first rotary sense of circular polarization within said first wavelength band.

18. The apparatus of claim 17, further comprising a second circular polarizer proximate to said cholesteric liquid crystal element.

19. A method for optically collimating an image at infinity or at a desired finite distance from an observer, comprising the steps of:
    directing an image light having components within at least a first predetermined wavelength band and of at least a first rotary sense of circular polarization onto a first surface of an optical doublet, a portion of said image light passing through said optical doublet, wherein said optical doublet is comprised of a first optical singlet and a second optical singlet and a partially reflective coating interposed therebetween;
    reflecting said passed image light within said first predetermined wavelength band and of said first rotary sense of circular polarization with a cholesteric liquid crystal element, said reflected image light passing through said second surface of said optical doublet;
    collimating a portion of said reflected image light with said partially reflective coating, said first rotary sense of circular polarization changing to a second rotary sense of circular polarization upon reflection by said partially reflective coating; and
    projecting said collimated image light of said second rotary sense of circular polarization through said cholesteric liquid crystal element to said observer.

20. The method of claim 19, further comprising the steps of:
    reflecting said passed image light within a second predetermined wavelength band and of said first rotary sense of circular polarization with a second cholesteric liquid crystal element, said reflected image light passing through said second surface of said optical doublet;
    collimating a portion of said reflected image light of said second wavelength band with said partially reflective coating, said first rotary sense of circular polarization changing to said second rotary sense of circular polarization upon reflection by said partially reflective coating; and
    projecting said collimated image light of said second wavelength band and of said second rotary sense of circular polarization through said first and second cholesteric liquid crystal elements to said observer.

21. The method of claim 19, further comprising the step of combining said image light with an observer line-of-sight image light, said combined image light directed to said first surface of said optical doublet, wherein said observer line-of-sight image light has components within a plurality of wavelength bands.

* * * * *